United States Patent
Guang et al.

(10) Patent No.: US 12,474,596 B1
(45) Date of Patent: Nov. 18, 2025

(54) OVERMOLDED TEMPLE WITH THERMAL MANAGEMENT WINDOW

(71) Applicants: Muye Guang, Playa Vista, CA (US); Stoyan Hristov, Gilroy, CA (US); Mathias Hintermann, Culver City, CA (US); Nicholas Streets, View Park, CA (US); Mark Kraz, Los Gatos, CA (US)

(72) Inventors: Muye Guang, Playa Vista, CA (US); Stoyan Hristov, Gilroy, CA (US); Mathias Hintermann, Culver City, CA (US); Nicholas Streets, View Park, CA (US); Mark Kraz, Los Gatos, CA (US)

(73) Assignee: Snap Inc., Santa Monica, CA (US)

( * ) Notice: Subject to any disclaimer, the term of this patent is extended or adjusted under 35 U.S.C. 154(b) by 357 days.

(21) Appl. No.: 18/140,858

(22) Filed: Apr. 28, 2023

(51) Int. Cl.
*G02C 5/14* (2006.01)

(52) U.S. Cl.
CPC ..................... *G02C 5/14* (2013.01)

(58) Field of Classification Search
CPC ...................................................... G02C 5/14
USPC ...................................................... 351/111
See application file for complete search history.

(56) References Cited

U.S. PATENT DOCUMENTS

| | | | |
|---|---|---|---|
| 6,619,799 B1* | 9/2003 | Blum | A61B 3/028 351/159.39 |
| 9,740,023 B1* | 8/2017 | Ashwood | G02C 5/14 |
| 10,928,658 B1* | 2/2021 | Ashwood | H05K 5/0086 |
| 2012/0127420 A1* | 5/2012 | Blum | G02C 5/146 351/113 |
| 2014/0078462 A1* | 3/2014 | Abreu | H04R 1/1016 351/158 |
| 2015/0323808 A1* | 11/2015 | Chen | G02C 5/00 351/103 |
| 2016/0212888 A1* | 7/2016 | Nikkhoo | G02B 7/008 |
| 2021/0109371 A1* | 4/2021 | Godeau | G02C 5/008 |
| 2022/0109230 A1* | 4/2022 | Ashwood | H05K 1/0237 |

* cited by examiner

*Primary Examiner* — Sharrief I Broome
(74) *Attorney, Agent, or Firm* — CM Law; Stephen J. Weed (57) ABSTRACT

An electronic eyewear device having temples that are lightweight, aesthetically pleasant, and include thermal management. The temples each have a thermally conductive stiffener with a non-thermally conductive overmolded material forming a window. The window in each temple exposes interior components, such the stiffener to ambient air, and allows heat generated by electronic components to be released to ambient air to cool the components through convection. The windows also allow the stiffeners to be coupled to tooling and are easily overmolded. The windows provide both an aesthetic feature and a functional feature.

16 Claims, 8 Drawing Sheets

OVERMOLDED TEMPLE WITH THERMAL MANAGEMENT WINDOW

TECHNICAL FIELD

Examples set forth in the present disclosure relate to portable electronic devices, including wearable electronic devices such as eyeglasses. More particularly, but not by way of limitation, the present disclosure describes an electronic eyewear device having a thermal management feature.

BACKGROUND

Wearable consumer electronic devices include electronic components. The electronic components within the wearable consumer electronic devices generate heat.

BRIEF DESCRIPTION OF THE DRAWINGS

Features of the various implementations disclosed will be readily understood from the following detailed description, in which reference is made to the appending drawing figures. A reference numeral is used with each element in the description and throughout the several views of the drawing. When a plurality of similar elements is present, a single reference numeral may be assigned to like elements, with an added lower-case letter referring to a specific element.

The various elements shown in the figures are not drawn to scale unless otherwise indicated. The dimensions of the various elements may be enlarged or reduced in the interest of clarity. The several figures depict one or more implementations and are presented by way of example only and should not be construed as limiting. Included in the drawing are the following figures.

DETAILED DESCRIPTION

An electronic eyewear device having temples that are lightweight, aesthetically pleasant, and include thermal management. The temples each have a thermally conductive stiffener with a non-thermally conductive overmolded material forming a window. The window in each temple exposes interior components, such the stiffener to ambient air, and allows heat generated by electronic components to be released to ambient air to cool the components through convection. The windows also allow the stiffeners to be coupled to tooling and are easily overmolded. The windows provide both an aesthetic feature and a functional feature.

The following detailed description includes systems, methods, techniques, instruction sequences, and computing machine program products illustrative of examples set forth in the disclosure. Numerous details and examples are included for the purpose of providing a thorough understanding of the disclosed subject matter and its relevant teachings. Those skilled in the relevant art, however, may understand how to apply the relevant teachings without such details. Aspects of the disclosed subject matter are not limited to the specific devices, systems, and method described because the relevant teachings can be applied or practiced in a variety of ways. The terminology and nomenclature used herein is for the purpose of describing particular aspects only and is not intended to be limiting. In general, well-known instruction instances, protocols, structures, and techniques are not necessarily shown in detail.

The term "connect", "connected", "couple" and "coupled" as used herein refers to any logical, optical, physical, or electrical connection, including a link or the like by which the electrical or magnetic signals produced or supplied by one system element are imparted to another coupled or connected system element. Unless described otherwise, coupled or connected elements or devices are not necessarily directly connected to one another and may be separated by intermediate components, elements, or communication media, one or more of which may modify, manipulate, or carry the electrical signals. The term "on" means directly supported by an element or indirectly supported by the element through another element integrated into or supported by the element.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

Reference now is made in detail to the examples illustrated in the accompanying drawings and discussed below.

Heat generated during the operation of wearable devices may impair their normal functions. A wearable device that includes a thermal management device is disclosed. The wearable device includes a body that holds one or more optical elements. It also includes onboard electronic components and a heat source that radiates heat during operation of the components. The device also includes a heat sink at another area of the eyewear body and a thermal coupling disposed within the eyewear body thermally coupled to the heat source and the heat sink to increase heat dissipation of the electronic components.

Figure 1:
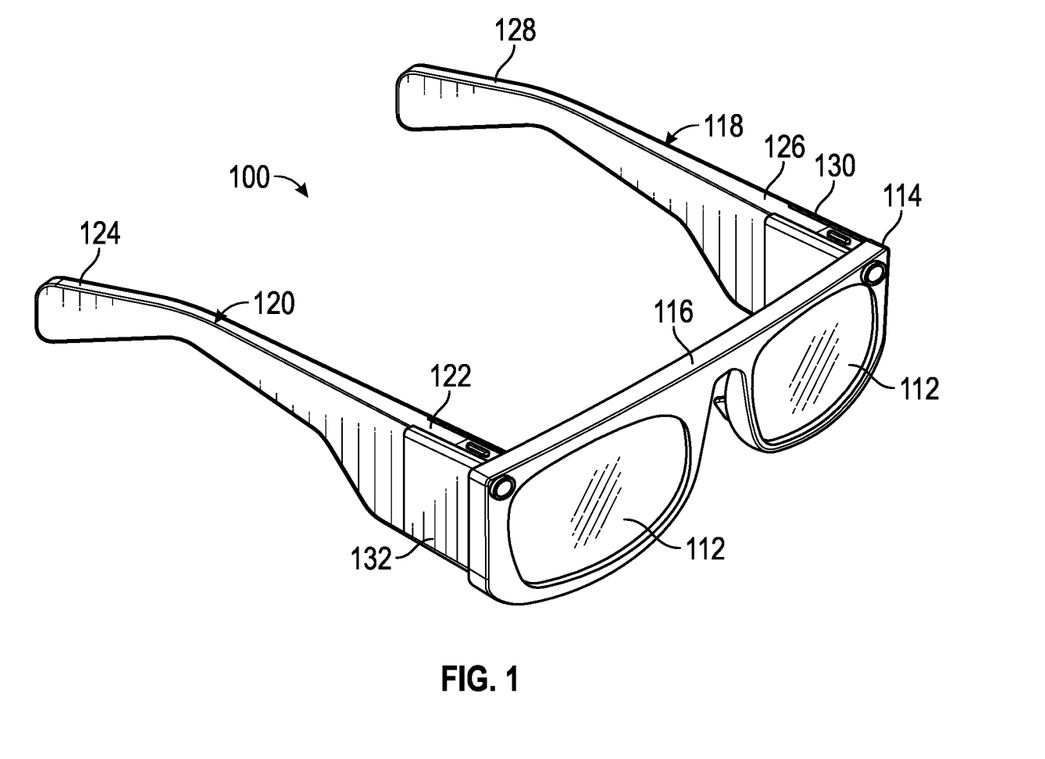
FIG. 1 is a front perspective view of an example electronic eyewear device.
Figure 2:
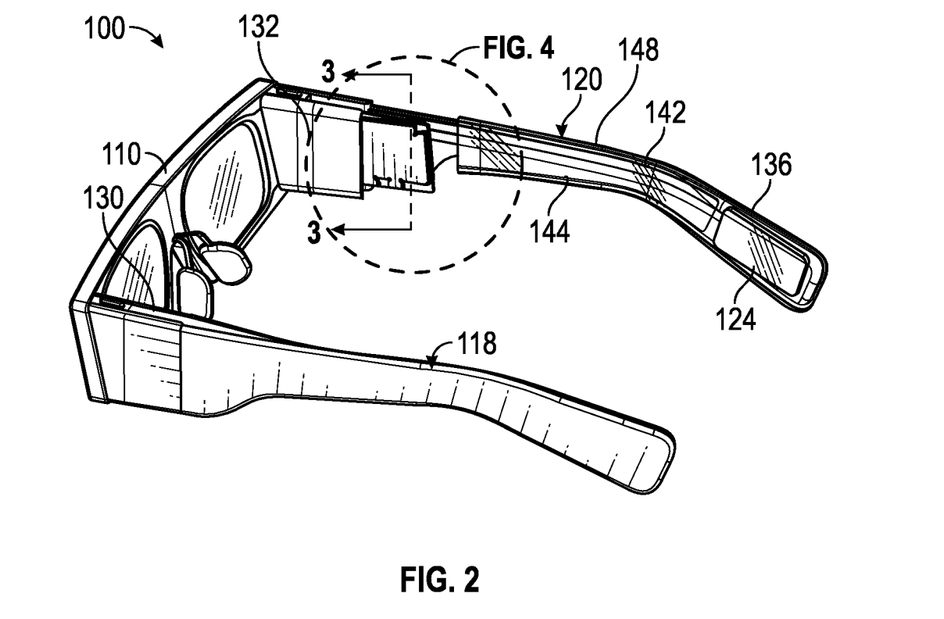
FIG. 2 is a rear perspective view of the electronic eyewear device of FIG. 1.

FIG. 1 is a front perspective view of an electronic eyewear device 100 and FIG. 2 is a rear perspective view of the electronic eyewear device 100 configured to be worn on the head of a user. The electronic eyewear device 100 comprises an eyewear body 110 that holds and supports one or more optical elements 112 within a field of view of the user. In this non-limiting example, eyewear body 110 includes a frame 114 having a bridge 116 that is constructed and arranged to sit on a nose of the user. A proximal section 126 of the left temple 118 is thermally coupled to a left side of bridge 116 and extends rearwardly a sufficient length to a distal section 128 configured to extend over a left ear of the user. A proximal section 122 of the right temple 120 is thermally coupled to a right side of bridge 116 and extends rearwardly a sufficient length to a distal section 124 configured to extend over a right ear of the user. Also shown in these views are compartments 130 and 132 for at least partially housing onboard electronic components 134 including a processor (shown in FIG. 3 and FIG. 4) that controls operation of the eyewear device 100. Onboard electronic components 134 may produce excess heat that interferes with normal operation of the electronic eyewear device 100. A battery 136 is provided at the distal end 124 of the right temple 120 to power the onboard electronic components 134, and at the distal end 128 of the left temple 118.

Figure 3:
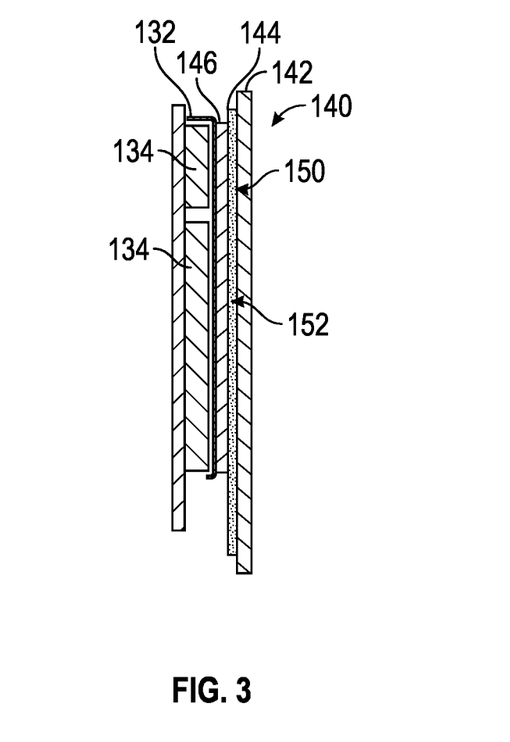
FIG. 3 is a sectional view of the right temple taken along line 3-3 in FIG. 2.
Figure 4:
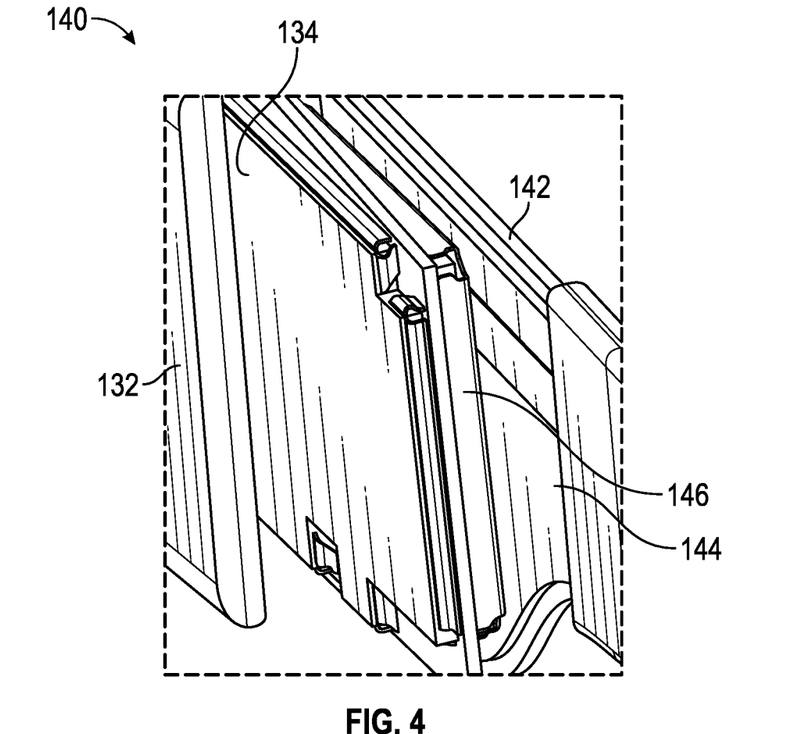
FIG. 4 is an enlarged sectional view of the thermal management system of FIG. 2

FIG. 3 shows a side cross sectional view taken along lines 3-3 of the right temple 120 shown in FIG. 2 and illustrates an example thermal management device 140 for managing and dissipating the excess heat generated by onboard electronic components 134 to maintain normal operation of electronic eyewear device 100. FIG. 4 illustrates an enlarged sectional view of the thermal management device 140 of the right temple 120, wherein the left temple 118 mirrors the right temple 120 and also includes a thermal management device 140. The onboard electronic components 134, which are substantially housed within compartments 130 and 132, comprise a heat source producing heat. Each thermal management device 140 includes a thin and generally planar sheet metal 142 and a thin and generally planar vapor chamber 144 that are coupled together along their length, such as by welding. The sheet metal 142 and the vapor chamber 144 extend the length of the right temple 120 and dissipate heat produced by the onboard electronic components 134. Thermal paste 146 is disposed between an outer surface of vapor chamber 144 and an inner surface of the opposing compartment 132. Paste 146 is configured to evenly and thermally couple heat from the onboard electronic components 134 and chamber 132 to both the vapor chamber 144 and the sheet metal 142. The sheet metal 142 forms a structural backbone for the vapor chamber 144, and it may be comprised of titanium. The sheet metal 142 is shaped to bias the temple 120 against a head of the user when worn. Each of the temples 118 and 120 can be slightly bent without breaking.

The sheet metal 142 and the vapor chamber 144 are encompassed by a non-thermally conductive material 148, such as by overmolding them in silicone. FIG. 2 illustrates some of the material 148 removed in the midsection of right temple 120 to illustrate the vapor chamber 144. The vapor chamber 144 is very thin, and hollow, having an elongated thin cavity 150 encompassed in the vapor chamber 144 and extending the length of the right temple 120. In one example, cavity 150 may have a thickness of 0.02 millimeters, wherein the vapor chamber 144 has a thickness of 0.08 millimeters. A liquid 152 is disposed in cavity 150 and heats up when the vapor chamber 144 heats up. Liquid 152 will change phase to vapor when heated. During this phase change from liquid to vapor, the temperature of the vapor chamber 144 is held constant rather than continuing to heat up. This allows vapor chamber 144 to pull more heat from the onboard electronic components 134 than compared to a standard heat sink.

In another example, the thickness of the walls of the vapor chamber 144 can have increased thickness to eliminate the need for the sheet metal 142.

Figure 5:
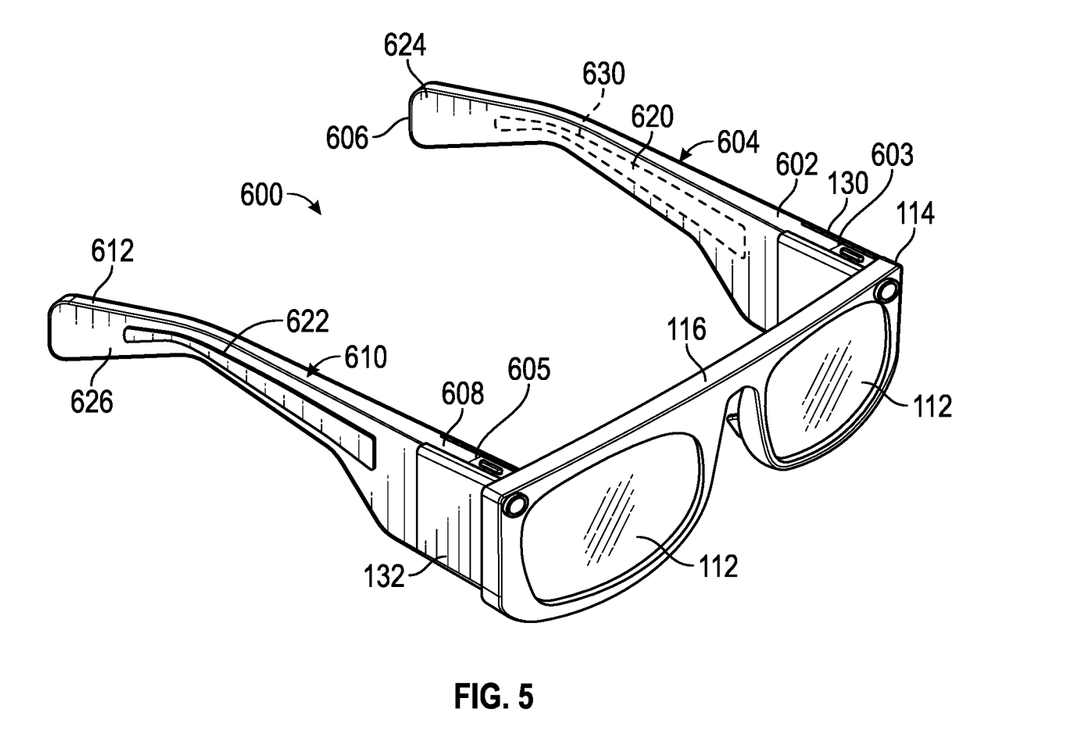
FIG. 5 is a front perspective view of another example electronic eyewear device.
Figure 6:
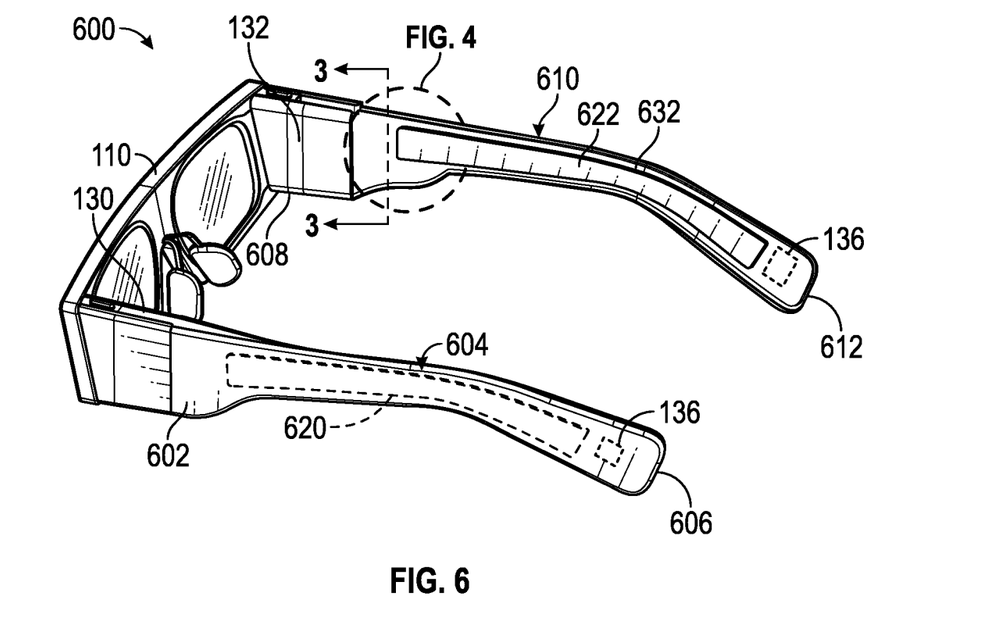
FIG. 6 is a rear perspective view of the electronic eyewear device of FIG. 5.

FIG. 5 is a front perspective view of another example of an electronic eyewear device 600 that is similar to eyewear device 100, wherein like numerals refer to like elements. FIG. 6 is a rear perspective view of the electronic eyewear device 600. The electronic eyewear device is configured to be worn on the head of a user. The electronic eyewear device 600 comprises eyewear body 110 that holds and supports one or more optical elements 112 within a field of view of the user. In this non-limiting example, eyewear body 110 includes frame 114 having a bridge 116 that is constructed and arranged to sit on a nose of the user.

A proximal section 602 of a left temple 604 is thermally coupled to the left side of bridge 116 by a hinge 603. Left temple 604 extends rearwardly a sufficient length to a distal section 606 configured to extend over a left ear of the user. A proximal section 608 of right temple 610 is thermally coupled to a right side of bridge 116 by a hinge 605. Right temple 610 extends rearwardly a sufficient length to a distal section 612 configured to extend over a right ear of the user.

Compartments 130 and 132 partially house onboard electronic components 134 including a processor (shown in FIG. 3 and FIG. 4) that controls operation of the eyewear device 600. Onboard electronic components 134 produce heat that may interfere with normal operation of the electronic eyewear device 600. Hinges 603 and 605 thermally transfer heat from respective onboard electronic components 134 to temples 604 and 610, respectfully. Battery shield 136 is provided at distal section 612 of the right temple 610 and at the distal section 606 of left temple 604 (e.g., to encompass a battery to power the onboard electronic components 134).

Temples 604 and 610 have a bendable, lightweight, thermally conductive, planar support member comprised of a stiffener 620 and 622, respectively, formed of a lightweight material such as titanium. Stiffeners 620 and 622 are overmolded with a resilient, compliant, non-thermally conductive material 624 and 626, respectively, such as silicon rubber. Hinges 603 and 605 thermally transfer heat generated by respective onboard electronic components 134 to respective stiffeners 620 and 622.

Figure 7:
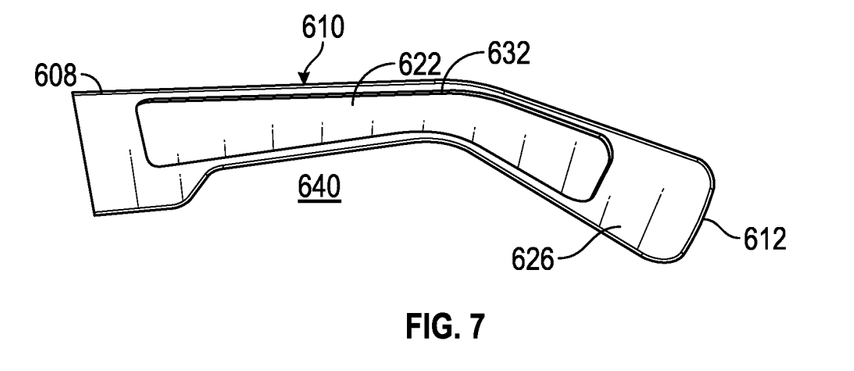
FIG. 7 is side perspective view of a temple having a window exposing a stiffener.

The overmolded material 624 and 626 forms an elongated window 630 and 632, respectively, that exposes the respective stiffeners 620 and 622 to ambient air 640, as further illustrated in FIG. 7. In an example, windows 630 and 632 are formed on an outer surface of the respective temple 604 and 610 that faces away from a user when eyewear 600 is worn by a user, as shown. Alternatively, windows 630 and 632 are formed on an inside surface of the respective temple 604 and 610 that faces towards a user when eyewear 600 is worn by a user. In another embodiment, a window can be formed on both an inside surface and an outside surface of temples 604 and 610. In another embodiment, the stiffeners 620 and 622 can each have openings, for example, that correspond in shape to the windows 630 and 632.

The exposed stiffeners have several features, including providing thermal cooling to the ambient air to help cool electronic components 134 through convection. Temples 604 and 610 are more lightweight, and also have a pleasant aesthetic design.

In another example, stiffeners 620 and 622 can be support means having structure configured to support temples 604 and 610, respectively. The support means has strength and stiffness that allows the temples 604 and 610 to secure eyewear device over ears of a user and remain in place during use by the user. Examples of support means can include, but is not limited to, a metal, plastic, or a composite material. The overmolded material 624 and 626 can be means having structure configured to cover portions of the support means and form window 630 and 632, respectively, and reduce heat generated by the support means from communicating to ambient 640. Examples of means configured to cover portions of the support means can include, but is not limited to, silicon molded rubber, silicone, plastic, and a resilient or elastic material.

Figure 8:
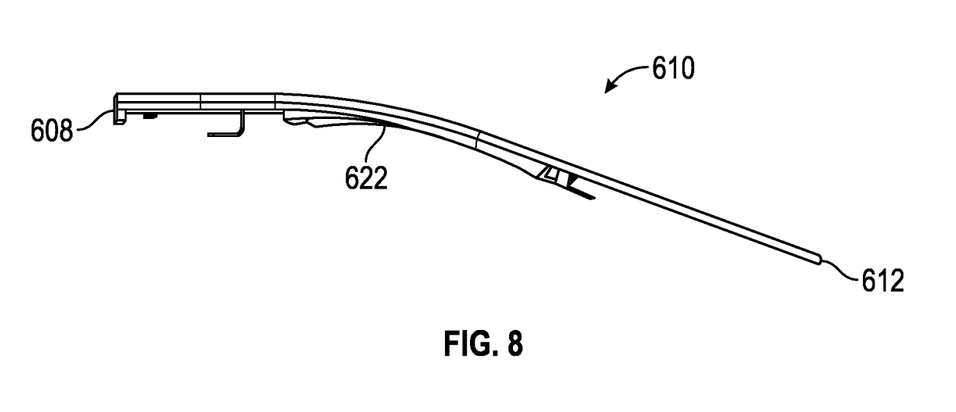
FIG. 8 is a top view of the temple of FIG. 7.

FIG. 8 illustrates the exposed portion of stiffener 622 of temple 610 providing a contact area for machine tools, such as a top and bottom tool (not shown) to contact the exposed portion of stiffener 622 and improve the overmolding process. The exposed portion of stiffener 622 makes the overmolding process quicker, cheaper, and more reliable. (Inventors, please update FIG. 8 to be consistent with FIG. 7 as FIG. 8 appears to show a smaller stiffener window. Also please describe how the machine tools make better contact with the stiffeners to perform the overmolding process).

Figure 9:
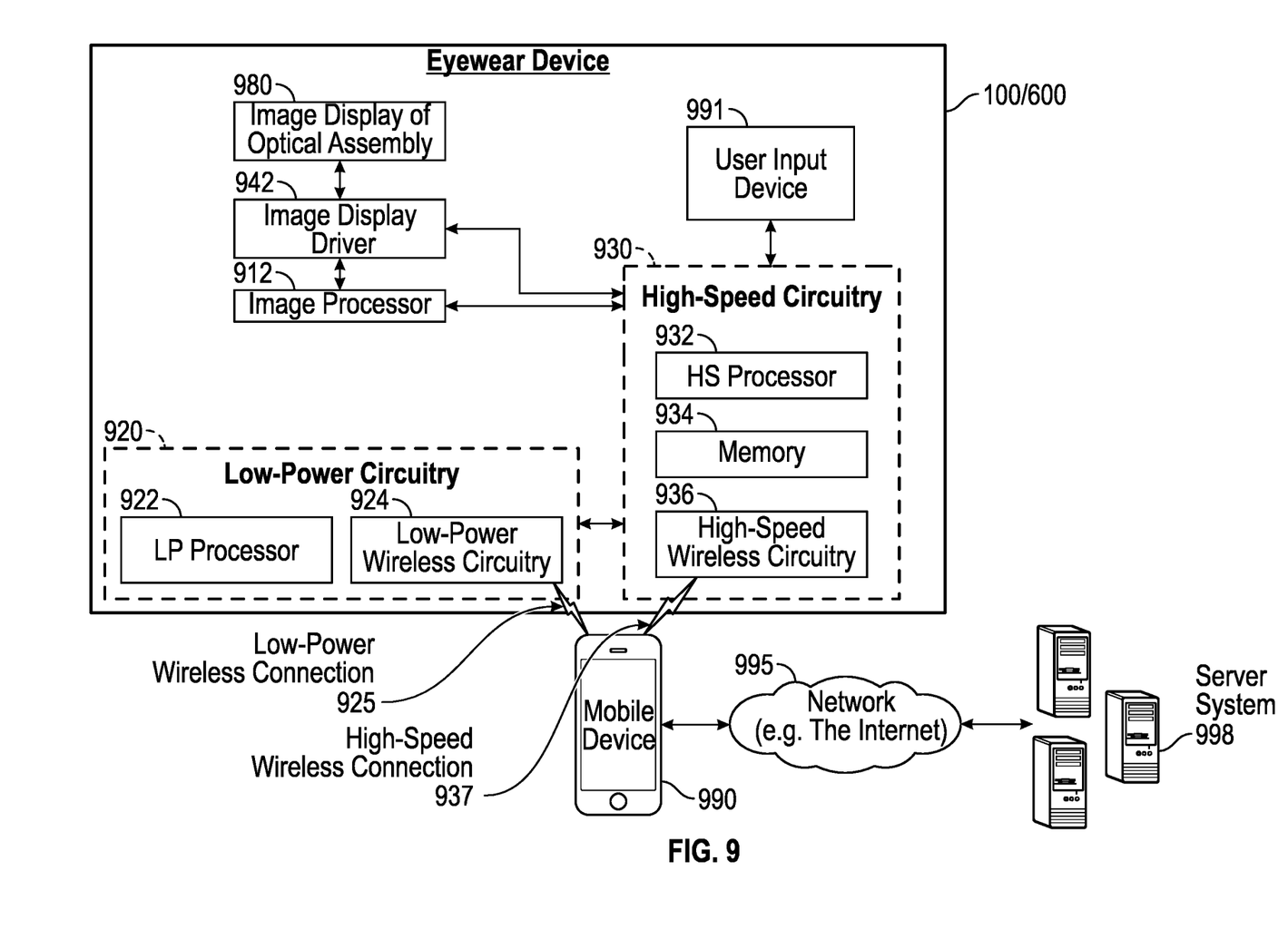
FIG. 9 is a block diagram of an example eyewear device in communication with a mobile device and a server system connected via various networks.

FIG. 9 is a block diagram that depicts example circuitry provided by components of electronic eyewear device 100, which may be located on one or more circuit boards located in the eyewear body 110, including compartments 130 and 132. As shown, circuitry 930 includes a high-speed processor 932, a memory 934, and high-speed wireless circuitry 936. In the example, the image display driver 942 is coupled to the high-speed circuitry 930 and operated by the high-speed processor 932 in order to drive the left and right image displays of electronic eyewear device having optical assemblies. High-speed processor 932 may be any processor capable of managing high-speed communications and operation of any general computing system needed for electronic eyewear device 100. High-speed processor 932 includes processing resources needed for managing high-speed data transfers on high-speed wireless connection 937 to a wireless local area network (WLAN) using high-speed wireless circuitry 936. In certain examples, the high-speed processor 932 executes an operating system such as a LINUX operating system or other such operating system of the electronic eyewear device 100 and the operating system is stored in memory 934 for execution. In addition to any other responsibilities, the high-speed processor 932 executes a software architecture for the electronic eyewear device 100 that is used to manage data transfers with high-speed wireless circuitry 936. In certain examples, high-speed wireless circuitry 936 is configured to implement Institute of Electrical and Electronic Engineers (IEEE) 802.11 communication standards, also referred to herein as Wi-Fi. In other examples, other high-speed communications standards may be implemented by high-speed wireless circuitry 936.

The low-power circuitry 920 includes a low-power processor 922 and low-power wireless circuitry 924. The low-power wireless circuitry 924 and the high-speed wireless circuitry 936 of the electronic eyewear device 100 can include short range transceivers (Bluetooth™) and wireless wide, local, or wide-area network transceivers (e.g., cellular or WiFi). Mobile device 990, including the transceivers communicating via the low-power wireless connection 925 and the high-speed wireless connection 937, may be implemented using details of the architecture of the electronic eyewear device 100, as can other elements of the network 995.

Memory 934 includes any storage device capable of storing various data and applications, including, among other things, camera data generated by camera(s), the image processor 912, and images generated for display by image display driver 942 on the image display of optical assemblies. Although the memory 934 is shown as integrated with high-speed circuitry 930, the memory 934 in other examples may be an independent, standalone element of the electronic eyewear device 100. In certain such examples, electrical routing lines may provide a connection through a chip that includes the high-speed processor 932 from the image processor 912 or low-power processor 922 to the memory 934. In other examples, the high-speed processor 932 may manage addressing of memory 934 such that the low-power processor 922 will boot the high-speed processor 932 any time that a read or write operation involving memory 934 is needed.

As shown, the high-speed processor 932 of the electronic eyewear device 100 can be coupled to the camera system, the image display driver 942, the user input device 991, and the memory 934.

The output components of the electronic eyewear device 100 include visual elements, such as the left and right image displays associated with each lens or optical assembly (not shown), a plasma display panel (PDP), a light emitting diode (LED) display, a projector, or a waveguide. Eyewear device 100 may include a user-facing indicator (e.g., an LED or a vibrating actuator), or an outward-facing signal (e.g., an LED). The image displays 980 of each optical assembly are driven by the image display driver 942. In some example configurations, the output components of the electronic eyewear device 100 further include additional indicators such as tactile components (e.g., an actuator such as a vibratory motor to generate haptic feedback), and other signal generators. The user-facing set of indicators are configured to be seen or otherwise sensed by the user of the device 100. For example, eyewear device 100 may include an LED display positioned so the user can see it, a loudspeaker positioned to generate a sound the user can hear, or an actuator to provide haptic feedback the user can feel. The outward-facing set of signals are configured to be seen or otherwise sensed by an observer near device 100. Similarly, device 100 may include an LED, a loudspeaker, or an actuator that is configured and positioned to be sensed by an observer.

The input components of the eyewear device 100 may include alphanumeric input components (e.g., a touch screen or touchpad configured to receive alphanumeric input, a photo-optical keyboard, or other alphanumeric-configured elements), pointer-based input components (e.g., a mouse, a touchpad, a trackball, a joystick, a motion sensor, or other pointing instruments), tactile input components (e.g., a button switch, a touch screen or touchpad that senses the location or force of touches or touch gestures, or other tactile-configured elements), and audio input components (e.g., a microphone), and the like. The mobile device 990 and the server system 998 may include alphanumeric, pointer-based, tactile, audio, and other input components.

Figure 10:
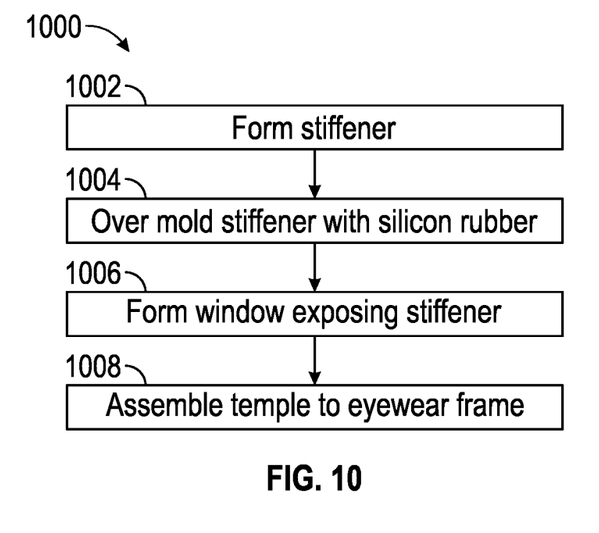
FIG. 10 is a flowchart illustrating steps of a method for forming the temples.

FIG. 10 depicts a flow chart 1000 illustrating steps of a method for making temples 804 and 810 shown in FIGS. 5-8.

At block 1002, stiffeners 820 and 822 are each formed and shaped from a bendable, planar, lightweight material, such as titanium. Automatic or manual tooling (not shown) trims and shapes the material to form planar, elongated members.

At block 1004, stiffeners 820 and 822 are partially overmolded with a thermally non-conductive and resilient material, such as silicon rubber. Tooling (not shown) is coupled to and supports the stiffeners 820 and 822 at each respective end while overmolding between contact portions of the tooling.

At block 1006, windows 630 and 632 are formed on stiffeners 820 and 822 during the overmolding process, and the formation of temples 604 and 610 is complete. Windows 630 and 632 expose the middle portions of stiffeners 820 and 822 to ambient and provide cooling of electronic components 134.

At block 1008, the completed temples 604 and 610 are assembled to frame 114 as shown in FIG. 5 and FIG. 6. The windows 630 and 632 are multi-purpose as they are both functional and aesthetic.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. An electronic eyewear device, comprising:
   a frame configured to be worn on a head of a user;
   an optical component supported by the frame; and
   a temple coupled to the frame, wherein the temple comprises:
      a thermally conductive support member having a proximal end that extends to a distal end;
      a material overmolded on the support member and defining a window exposing a portion of the support member between the proximal end and the distal end to ambient, and
      an electronic component configured to generate heat during powered operation, wherein the exposed portion of the support member is coupled to the electronic component and is configured to release the heat to ambient.

2. The electronic eyewear device of claim 1, wherein the window is elongated and extends along a middle portion of the temple.

3. The electronic eyewear device of claim 1, wherein the temple has an outside portion configured to face away from the user when worn, wherein the window is defined on the outside portion.

4. The electronic eyewear device of claim 1, wherein the support member is planar.

5. The electronic eyewear device of claim 1, wherein the material is non-thermally conductive.

6. The electronic eyewear device of claim 5, wherein the material is resilient.

7. The electronic eyewear device of claim 6, wherein the material comprises silicon rubber.

8. The electronic eyewear device of claim 1, further comprising a battery shield coupled to the temple distal end.

9. A method of making an electronic eyewear product comprising a frame configured to be worn on a head of a user, an optical component supported by the frame, a temple coupled to the frame, and an electronic component configured to generate heat during powered operation the method comprising:
   forming a thermally conductive support member having a proximal end that extends to a distal end;
   overmolding a material on the support member to form the temple, the overmolding producing a window within the material exposing a portion of the support member between the proximal end and the distal end to ambient, wherein the exposed portion of the support member is coupled to the electronic component and is configured to release the heat to ambient; and
   coupling the temple to the frame.

10. The method of claim 9, wherein the window is elongated and extends along a middle portion of the temple.

11. The method of claim 9, wherein the temple has an outside portion configured to face away from the user when worn, wherein the window is defined on the outside portion.

12. The method of claim 9, wherein the support member is planar.

13. The method of claim 9, wherein the material is non-thermally conductive.

14. The method of claim 13, wherein the material is resilient.

15. The method of claim 14, wherein the material comprises silicon rubber.

16. An electronic eyewear device, comprising:
   a frame configured to be worn on a head of a user;
   an optical component supported by the frame; and
   a temple coupled to the frame, wherein the temple comprises:
      support means that is thermally conductive and having a proximal end that extends to a distal end; and
      means overmolded on the support means and defining a window exposing a portion of the support means between the proximal end and the distal end to ambient, and an electronic component configured to generate heat during powered operation, wherein the exposed portion of the support means is coupled to the electronic component and configured to release the heat to ambient.

* * * * *